United States Patent [19]

Wagner et al.

[11] Patent Number: 4,878,928

[45] Date of Patent: Nov. 7, 1989

[54] APPARATUS FOR INCREASING REGENERATIVE FILTER HEATING ELEMENT TEMPERATURE

[75] Inventors: Wayner M. Wagner, Apple Valley; Douglas E. Flemming, Rosemount, both of Minn.

[73] Assignee: Donaldson Company, Inc., Minneapolis, Minn.

[21] Appl. No.: 225,477

[22] Filed: Jul. 28, 1988

[51] Int. Cl.[4] .............................................. B01D 46/00

[52] U.S. Cl. ........................................ 55/466; 55/523; 55/DIG. 30; 55/282; 60/303; 60/311

[58] Field of Search ................. 55/DIG. 30, 267, 282, 55/283, 466, 523; 60/311, 303

[56] References Cited

U.S. PATENT DOCUMENTS

| | | | |
|---|---|---|---|
| 3,499,269 | 3/1970 | Bois | 55/309 |
| 4,167,852 | 9/1979 | Ludecke | 60/296 |
| 4,211,075 | 7/1980 | Ludecke et al. | 60/285 |
| 4,270,936 | 6/1981 | Mann | 55/520 |
| 4,276,066 | 6/1981 | Bly et al. | 55/287 |
| 4,319,896 | 3/1982 | Sweeney | 55/213 |
| 4,427,418 | 1/1984 | Kogiso et al. | 55/287 |
| 4,485,622 | 12/1984 | Takagi et al. | 60/296 |
| 4,505,107 | 3/1985 | Yamaguchi et al. | 60/303 |
| 4,519,820 | 5/1985 | Oyobe et al. | 55/284 |
| 4,523,935 | 6/1985 | Takagi et al. | 55/282 |
| 4,535,589 | 8/1985 | Yoshida et al. | 60/303 |
| 4,538,411 | 9/1985 | Wade et al. | 60/274 |
| 4,544,388 | 10/1985 | Rao et al. | 55/282 |
| 4,548,625 | 10/1985 | Ishida et al. | 55/282 |
| 4,562,695 | 1/1986 | Rao | 60/303 |
| 4,641,496 | 2/1987 | Wade | 60/274 |
| 4,662,911 | 5/1987 | Hirayama et al. | 55/DIG. 30 |
| 4,686,827 | 8/1987 | Wade et al. | 60/286 |
| 4,744,216 | 5/1988 | Rao et al. | 60/303 |

OTHER PUBLICATIONS

"Corning Ceramics Dieselfilter Product Data Brochure", Corning, 8-85.

*Primary Examiner*—Bernard Nozick
*Attorney, Agent, or Firm*—Merchant, Gould, Smith, Edell, Welter & Schmidt

[57] ABSTRACT

A filter device for trapping particulates for diesel engine exhaust gases includes an electrical heating element to heat the face of the ceramic filter. A porous ceramic disc is place on the side of the heating element opposite the filter. It has been found that the disc keeps the temperature of the heating element more uniform and reduces the time to particulate ignition on the front face of the filter.

1 Claim, 2 Drawing Sheets

APPARATUS FOR INCREASING REGENERATIVE FILTER HEATING ELEMENT TEMPERATURE

FIELD OF THE INVENTION

The present invention is directed to the general field of systems for regenerating ceramic filters when used to remove particulates from gases, usually exhaust gases from diesel engines. More particularly, the invention is directed to enhancing the effectiveness of an electrical element which heats the inlet end of the ceramic filter until the carbon contained thereon ignites.

BACKGROUND OF THE INVENTION

Governments are increasingly regulating the exhaust emissions of vehicles. In particular, vehicles powered by diesel engines must meet more and more stringent regulations in the next several years. Cellular ceramic filters have been recognized as being useful in trapping particulates from exhaust emissions. As the filters become clogged, however, they must be regenerated or an unacceptable back pressure develops. A number of positive regeneration systems have been proposed which use variously, for example, a fuel fed burner (see U.S. Pat. No. 4,167,852), an electric heater (see U.S. Pat. Nos. 4,270,936; 4,276,066; 4,319,896), and detuning, techniques (see U.S. Pat. Nos. 4,211,075 and 3,499,269).

The present invention is directed to a regeneration system of a type which uses an electric heater to heat the inlet end of a ceramic filter until the particulates thereon ignite. Using reasonable amounts of power, electric heater systems, however, have had difficulty in achieving a uniform ignition across the front face or inlet end. Since most exhaust systems in vehicles are positioned horizontally, heat from the electric heater which is then situated along a substantially vertical plane, particularly heat which is directed away from the filter, rises and, consequently, on its reradiative or convective return heats the upper portion of the filter much more rapidly than the lower portion. Ignition then occurs first in the region of greater heat. When the flame front passing through the filter is uneven, temperature gradients are severe so that the ceramic may crack and before long break sufficiently to destroy the filter. In an attempt to solve the problem, heating elements have been moved as close as possible to the current face of the ceramic filter. In U.S. patent application Ser. No. 088,055, filed Aug. 21, 1987, a reflective surface is even shown on the side of the heater element opposite the filter. Neither is sufficient to solve the problem using only the power available from the electrical system of a truck. The present invention, however, addresses and solves the problem.

SUMMARY OF THE INVENTION

The filter apparatus of the present invention has regenerating means which include an electrical heating element. Mechanism for increasing the surface temperature of the heating element is spaced from the heating element and located on a side of the heating element opposite from the filter. The surface temperature of the heating element is increased because the natural tendency of heat rising is substantially reduced.

In a preferred embodiment, a porous ceramic disc is located adjacent to the heating element on the side of the heating element opposite the inlet face of the ceramic filter. Preferably, the side of the disc facing the heating element has a black coating on it. The porosity of the ceramic disc allows combustion air to pass through it toward the filter, but until the air leaves the disc and flows through the heating element toward the filter, does not allow the air to convectively rise. Furthermore, the black coating of the disc absorbs and re-emits the heat in a uniform fashion. Also, the disc heats uniformly and does not set up a conductive path to create non-uniformity. Thus, the disc eliminates any significant radiative, convective or conductive mechanisms which could alter the otherwise uniform heat distribution of the heating element.

DETAILED DESCRIPTION OF THE PREFERRED EMBODIMENT

Figure 1:
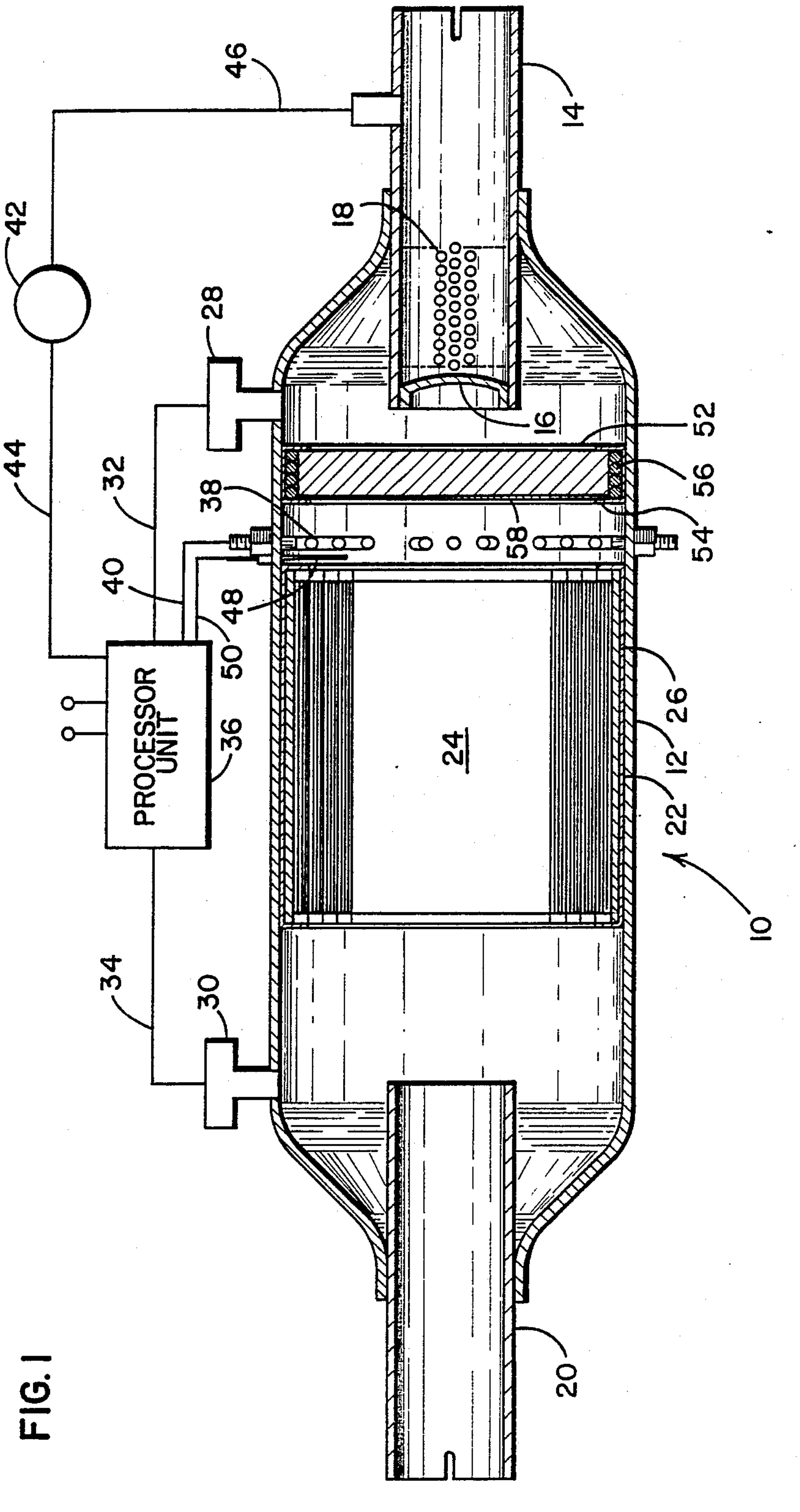
FIG. 1 is a cross-sectional view of filter apparatus for removing particulates from engine exhaust gases and which includes apparatus for increasing the heating element temperature in accordance with the present invention.

In reference to the drawings, like reference numerals throughout the several views designate identical or corresponding parts.

A typical regenerative filtration device for the exhaust gases of an engine, particularly a diesel engine, is shown in FIG. 1. Device 10 includes a housing 12 which is substantially cylindrical and has narrowed ends. An inlet pipe 14 is received at one end of housing 12. Inlet pipe 14 has a closed outlet end 16 and openings 18 to allow exhaust gas to expand from inlet pipe 14 into the entry portion of the chamber formed by housing 12. An outlet pipe 20 is received at the other end of housing 12.

A monolithic ceramic filter is mounted in a can 22 tack welded or otherwise affixed to housing 12. Can 22 has inturned ends to retain filter 24 therein. A heat resistent mat 26 provides insulation and cushioning between filter element 24 and can 22. A ceramic filter 24 of the type useful with respect to the present invention is commercially available from Industrial Ceramics Department, Ceramic Products Division, Corning Glass Works, Corning, New York 14830. In addition, a fuller discussion of the use of this type of ceramic filter with respect to a regenerative exhaust filtering system may be found in U.S. patent application Ser. No. 088,055, filed Aug. 21, 1987.

The back pressure to the engine or some kind of differential pressure monitoring system determines when filter 24 is loaded to a level which requires regeneration. Pressure sensors 28 and 30 illustrate such a sensing mechanism and are wired via lines 32 and 34 to a processor unit 36. At the appropriate time, processor unit turns on electric heater 38 via line 40. Also, a blower 42 is turned on via line 44 to direct the air therefrom through line 46 into the entry portion of the chamber enclosed by housing 12. A thermocouple 48 monitors temperature and provides information via line 50 to processor unit 36.

A porous ceramic disc 52 is mounted between the end 16 of inlet pipe 14 and heating element 38, preferably in close proximity to heating element 38. Disc 52 is held by a cylindrical channel 54 tack welded or otherwise affixed to housing 12. A fiberglass rope 56 or other sealing end cushioning gasket-like material is fitted between disc 52 and channel 54. Although not necessary, a black coating 58 is preferably applied to the side of disc 52 facing heating element 38.

In a test, disc 52 was made of lithium alumina silicate las having a thickness of one-half to one inch and a porosity of approximately 10 to 30 pores per inch. Acceptable material may be obtained commercially from HiTech Ceramics Inc., P.O. Box 1105, Alfred, New York 14802. Although the disc 52 traps some particulates in the exhaust gases passing therethrough, the porosity is great enough that filtering is not a significant function of the disc. Rather, the disc prevents air from blower 42 during regeneration from receiving heat radiated toward inlet pipe 14. A problem has been that such heat raises the temperature of the incoming combustible air which then rises. With disc 52 in device 10 as shown, incoming air exhausts through the openings 18 of inlet pipe 14 and fills the entry portion of the chamber so that as it is forced through disc 52, it flows at a relatively even flow rate from top to bottom.

Disc 52 serves a further function of receiving the radiative heat from heating element 38 and reradiating the heat back toward the front face of filter 24. This function is enhanced if the side facing filter 24 is covered with an acceptable black paint or other material. An acceptable material is available from the same commercial source as the material for disc 52. In addition, as the disc heats, any particulates trapped therein burn to further heat the disc and add to its radiative capacity.

It has been found through testing that the presence of disc 52 increases the temperature of heating element 38 from about 1400° F. without disc 52 to about 1700° F. with disc 52, at no increase in power to heating element 38. Furthermore, the heating time of the inlet face of filter 24 to achieve ignition decreased by approximately 30 percent.

Figure 2:
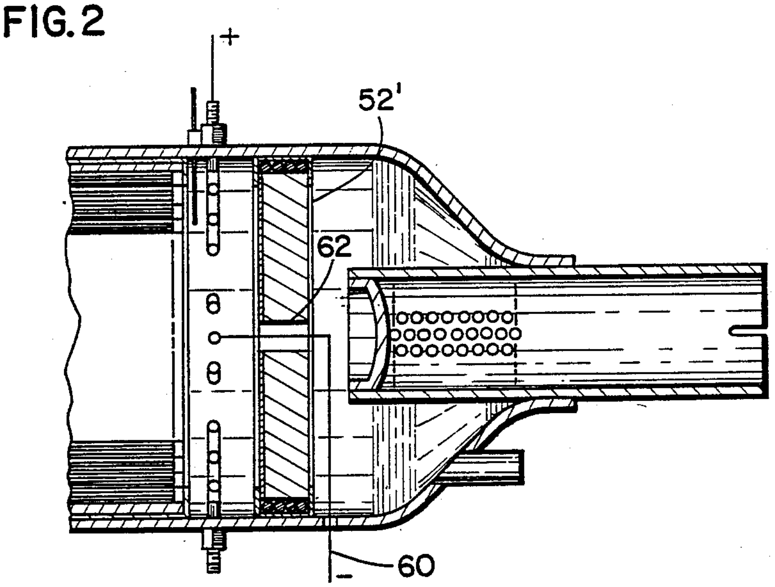
FIG. 2 is a cross-sectional view of an alternate embodiment of the temperature increasing apparatus.

An alternate embodiment of disc 52 is shown in FIG. 2, wherein like elements are designated by like numerals, only the numerals are primed. Heating element 38' is shown to have a lead 60 at its center. Disc 52' is shown to include a central opening 62 which allows passage therethrough for lead 60.

Figure 3:
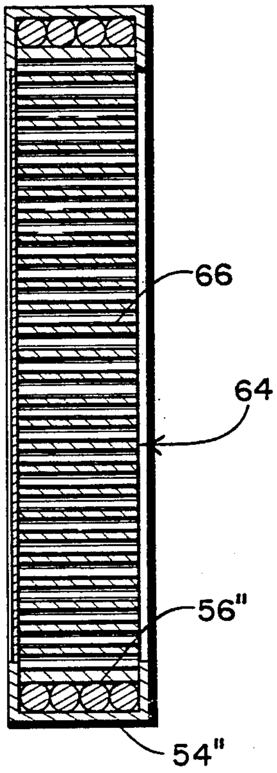
FIG. 3 is a second alternate embodiment of temperature increasing apparatus.

Another alternate embodiment is shown in FIG. 3 wherein like parts are designated by like numerals only double primed. A disc 64 is shown retained in a circular channel 54". A gasket material 56" is packed between disc 64 and channel 54". Disc 64 is formed to have a plurality of horizontal plates 66. Plates 66 simply prevent the incoming air from rising in a vertical dimension. Although this embodiment is not nearly as efficient as the other two, it does provide a noticeable increase in the temperature of the heating element and a noticeable decrease in the time to ignition on the front face of filter 24.

Although the present invention has thus been described in the form of several embodiments, it is understood that the disclosure is representative and that equivalents are possible. Consequently, changes made, especially in manners of shape, size and arrangement are within the principal of the invention to the full extent extended by the general meaning of the terms on which the appended claims are expressed.

What is claimed is:

1. Filter apparatus for reducing particulates from exhaust gases from an engine, comprising:

a housing having a chamber with an inlet, an outlet, and a fluid flow path leading from said inlet upstream to said outlet downstream;

means, within said chamber along said fluid flow path, for filtering the particulates from said exhaust gases, said filtering means including a ceramic filter element having an inlet end;

means for regenerating said ceramic filter element, said regenerating means including an electrical heating element with first and second sides, said heating element being supported by said housing, said heating element having a surface temperature;

a porous ceramic disc between said inlet to said chamber and said heating element, said disc having a side facing said heating element, said facing side including a black coating thereon, said disc being spaced from said heating element, said disc being supported by said housing;

said regenerating means including means for blowing air through said porous ceramic disc and said heating element toward the inlet end of said filter element tom initiate and maintain regenerative combustion; and means for controlling said regenerative means.

* * * * *